June 17, 1930.　　　A. C. FINNEY　　　1,765,264
PROTECTIVE ARRANGEMENT
Filed July 24, 1929
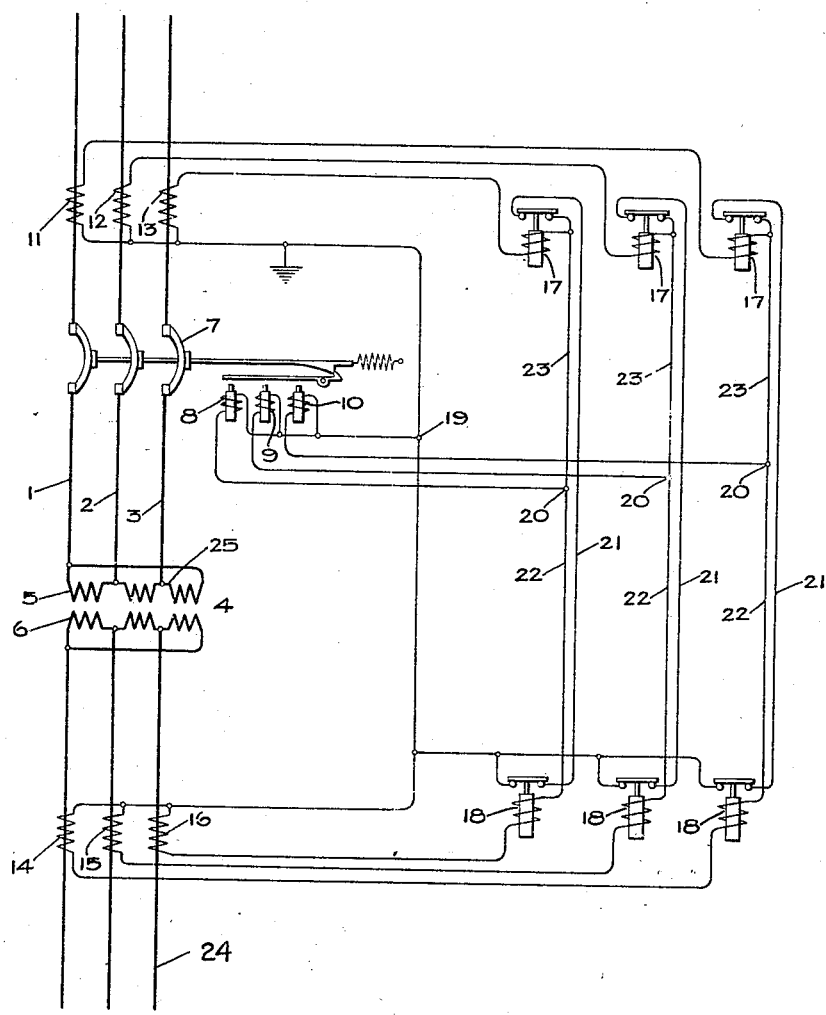
Inventor:
Alfred C. Finney,
by Charles E. Tullar
His Attorney Patented June 17, 1930

1,765,264

UNITED STATES PATENT OFFICE

ALFRED C. FINNEY, OF UPPER DARBY, PENNSYLVANIA, ASSIGNOR TO GENERAL ELECTRIC COMPANY, A CORPORATION OF NEW YORK

PROTECTIVE ARRANGEMENT

Application filed July 24, 1929. Serial No. 380,733.

My invention relates to improvements in protective arrangements for electric circuits and more particularly power transformers and has for an object to provide an improved and economical arrangement whereby protective control can be effected entirely from the circuit without any need of auxiliary sources of electromotive force.

Where a power transformer, particularly one of small capacity, is connected to a high capacity or a high voltage bus, it is often neither possible nor economical to furnish current transformers of low enough capacity to obtain proper protection against abnormal current conditions. On the high voltage side the demands of economy require bushing current transformers whose current ratio is comparatively high while on the low voltage side the usual instrument type of current transformers which may have a comparatively high current ratio can be used. Consequently, faults on the low voltage side of the power transformer affect the output of the current transformer on the low voltage side of the power transformer more than the output of the current transformer of the high voltage side. If the latter is of the instrument type its cost is frequently so high as to be economically prohibitive since it has to be insulated for a high voltage and of a capacity sufficient to withstand short-circuits on the power transformer. In order to avoid these and other difficulties, I provide an arrangement whereby the standard bushing and instrument type of current transformers may be employed and whereby the opening of the circuit interrupting means in response to abnormal circuit conditions can be effected directly from the circuit thus dispensing with auxiliary sources of current and the care in maintenance which they entail.

My invention will be better understood from the following description when considered in connection with the accompanying drawing and its scope will be pointed out in the appended claims.

The single figure of the accompanying drawing diagrammatically illustrates a protective arrangement embodying my invention as applied to the protection of an electric circuit, including phase conductors 1, 2, 3, a power transformer 4 of which 5 and 6 may be considered respectively the high and low voltage windings, and a circuit interrupting means such as a latch closed circuit breaker 7 provided with suitable electromagnetic opening means shown as trip coils 8, 9, 10.

For controlling these trip coils in response to abnormal circuit conditions to effect the opening of the circuit breaker directly from the circuit 1, 2, 3, I provide, in accordance with my invention, a plurality of protective circuits, one for each phase where protection against ground faults is required, including the secondaries of bushing type current transformers 11, 12, 13, the secondaries of instrument type current transformers 14, 15, 16 and the windings of over-current relays 17, 18. The over-current relays 17, 18 may be time delay or not accordingly as desired. Further in accordance with my invention, I arrange the relays 17 and 18 so that they are energized in accordance with the currents at two different points in the circuit 1, 2, 3, that is in accordance with the currents in the high and low voltage windings 5 and 6 of the power transformer 4 and so that by their conjoint action they control the energization of the trip coils 8, 9, 10. For this latter purpose, the relays 17 and 18 may have their contacts normally closed and connected in series in a circuit across the trip coils between the points 19, 20 and including the conductors 21, 22, 23.

The protective circuit for the phase conductor 3 includes, for example, the windings of the relays 17 and 18 on the left connected in parallel with each other and in series with the trip coil 8 so that while the relays 17 and 18 are respectively energized in accordance with the currents in the secondaries of the current transformers 13 and 16 the sum of these currents passes through the trip coil 8 whenever either of the relays 17 and 18 operates to open its contacts and thus interrupts the short-circuit across the trip coil.

If it be assumed, for example, that a fault, such as a ground fault, occurs on the low voltage or load side of the power transformer, for example, at 24 then, due to the accurate current ratio of the instrument current transformer 16, whether the fault is of a severe character or not, the secondary of this current transformer will supply sufficient current to the relay 18 in the associated phase to cause it to operate. This relay in opening its contacts removes the short-circuit from the trip coil 8 and the sum of the currents in the secondaries of the current transformers 13 and 16 is supplied through the windings of relays 17 and 18 in parallel to the trip coil 8 so as to effect its energization and thereby the opening of the circuit breaker 7. If the fault at 24 were of a relatively light character, there would not appear in the secondary of the current transformer 13 sufficient current to effect the operation of the relay 17, but this is immaterial since the relay 18 is sure to be supplied with sufficient current from the instrument type current transformer 16. On the other hand, if a fault were to occur on the high voltage side of the power transformer 4, for example a ground fault on one of the windings as at 25, then if the bus to which the circuit 1, 2, 3 is connected were of high capacity, a very large current would be supplied to the fault and in this case the bushing current transformer 13 even though of a relatively high current ratio that is low secondary output, would supply sufficient current to insure the operation of the relay 17. Again the sum of the currents in the secondary windings of the current transformers 13, 16 would be supplied to the trip coil 8. In case of a fault as at 24, the fault current would not be limited by the impedance of the transformer. Also, in case of a fault at 25, the fault current would not appear in the current transformer 16 but in this case the fault current would be of such a high intensity as to provide sufficient current despite the high current ratio of transformer 13 to insure the actuation of the tripping means. For faults on any of the other phase conductors, the operation will be similar to that pointed out for phase conductor 3. Of course, in case of a short-circuit between phase conductors, one or more of the relays 17 and 18 will respond and remove the short-circuit from one or more of the trip coils 8, 9, 10 and thereby insure the tripping of the circuit breaker 7.

What I claim as new and desire to secure by Letters Patent of the United States, is:

1. In combination, an electric circuit, circuit interrupting means therefor, means for effecting the opening of the interrupting means connected to be energized from said circuit, a plurality of relays respectively connected to be energized in accordance with the currents in said circuit at two different points thereof and a circuit controlled by the conjoint action of said relays for preventing the energization of the opening means until at least one of the relays operate.

2. In combination with an electric circuit, circuit interrupting means therefor and electromagnetic means for effecting the opening of the interrupting means, a plurality of relays having their windings respectively connected to be energized in accordance with the currents in said circuit at two different points thereof, a protective circuit including the windings of said relays connected in parallel with each other and in series with the windings of the electromagnetic opening means and a normally closed circuit connected across the winding of said opening means and including the contacts of said relays connected in series.

3. In combination with a power transformer, a circuit interrupter for controlling the circuit of the transformer, a trip coil for effecting the opening of the circuit interrupter, two relays having their windings respectively connected to be energized in accordance with the currents in the primary and secondary windings of the transformer, a protective circuit including the windings of said relays connected in parallel with each other and in series with the trip coil and a normally closed circuit connected across the trip coil and including the contacts of said relays connected in series.

4. In combination, a power transformer, a circuit interrupter for controlling the circuit of the transformer, a trip coil for effecting the opening of the interrupter connected for energization in accordance with the sum of the currents in the primary and secondary windings of the transformer, two overcurrent relays respectively connected to be energized in accordance with the currents in the primary and secondary windings of the transformer, and means for preventing the energization of said trip coil until at least one of the relays operates including a normally closed circuit having the contacts of said relays connected in series.

5. In combination, an electric circuit, circuit interrupting means therefor, means for effecting the opening of the interrupting means connected for energization in accordance with the sum of the currents in said circuit at two different points thereof, two overcurrent relays respectively connected to be energized in accordance with the currents at said points, and means for preventing the energization of said opening means until at least one of the relays operates including a circuit having the contacts of said relays connected in series therein.

In witness whereof, I have hereunto set my hand this 20th day of July, 1929.

ALFRED C. FINNEY.